United States Patent
Ma

(10) Patent No.: US 9,930,707 B2
(45) Date of Patent: Mar. 27, 2018

(54) IN-FLIGHT ENTERTAINMENT SYSTEM THAT IDENTIFIES WIRELESS ACCESS POINT LOCATIONS WITHIN CABIN

(71) Applicant: Thales Avionics, Inc., Irvine, CA (US)

(72) Inventor: Jueren Ma, Placentia, CA (US)

(73) Assignee: Thales Avionics, Inc., Irvine, CA (US)

( * ) Notice: Subject to any disclaimer, the term of this patent is extended or adjusted under 35 U.S.C. 154(b) by 283 days.

(21) Appl. No.: 14/796,679

(22) Filed: Jul. 10, 2015

(65) Prior Publication Data

US 2017/0013545 A1      Jan. 12, 2017

(51) Int. Cl.
*H04W 76/02* (2009.01)
*H04L 29/08* (2006.01)
*H04L 29/12* (2006.01)

(52) U.S. Cl.
CPC ....... *H04W 76/021* (2013.01); *H04L 61/2015* (2013.01); *H04L 61/609* (2013.01); *H04L 67/12* (2013.01)

(58) Field of Classification Search
CPC . H04L 61/2015; H04L 61/609; H04W 76/021
See application file for complete search history.

(56) References Cited

U.S. PATENT DOCUMENTS

| | | | | |
|---|---|---|---|---|
| 2002/0197984 A1* | 12/2002 | Monin | ................. | H04W 8/26 455/419 |
| 2005/0232164 A1* | 10/2005 | Anzarouth | ............ | H04L 29/06 370/255 |
| 2005/0253722 A1* | 11/2005 | Droms | ............... | G08B 13/2402 340/572.1 |
| 2007/0025306 A1* | 2/2007 | Cox | .................... | H04L 41/0806 370/338 |
| 2012/0089713 A1* | 4/2012 | Carriere | ............. | H04L 12/4641 709/222 |
| 2016/0277773 A1* | 9/2016 | Ho | .................... | H04N 21/26258 |

OTHER PUBLICATIONS

Stump et al., "The User Class Option for DHCP", Network Working Group, Request for Comments: 3004, Category: Standards Track, Nov. 2000, 6 pp.

* cited by examiner

*Primary Examiner* — David Oveissi
*Assistant Examiner* — Thomas D Busch
(74) *Attorney, Agent, or Firm* — Sage Patent Group

(57) ABSTRACT

A method by a cabin wireless access point (CWAP) server includes receiving an IP address request message from a CWAP installed in a vehicle cabin. The IP address request message contains data identifying a physical location of the CWAP within the vehicle cabin. The physical location of the CWAP is identified within the vehicle cabin responsive to the data contained in the IP address request message. An IP address is assigned to the CWAP responsive to the physical location of the CWAP identified by the data. An IP address message containing the IP address is communicated to the CWAP. Related methods by CWAPs and corresponding CWAP servers and CWAPs are disclosed.

13 Claims, 5 Drawing Sheets

DHCP Message Option

| 77 | N | User class data Identifying one of a plurality of defined physical locations within the vehicle cabin |
|---|---|---|

FIGURE 4 dhcpd.conf

```
class "CWAP_1" { match if option user-class = "CWAP_1";}
class "CWAP_2" { match if option user-class = "CWAP_2";}
class "CWAP_2" { match if option user-class = "CWAP_3";}

Subnet 172.17.0.0 netmask 255.255.255.0 {
pool {
        range 172.17.8.2 172.17.8.2;
        allow members of "CWAP_1";
} pool {
        range 172.17.8.4 172.17.8.4;
        allow members of "CWAP_2";
}
pool {
        range 172.17.8.48 172.17.8.48;
        allow members of "CWAP_3";
} default-lease-time 300;
max-lease-time 300;
option broadcast-address 172.17.8.255;
option routers 172.17.8.254;
}
```

FIGURE 5

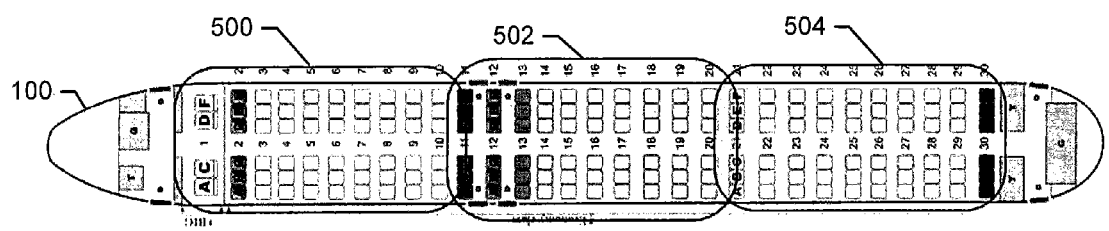

FIGURE 6

IN-FLIGHT ENTERTAINMENT SYSTEM THAT IDENTIFIES WIRELESS ACCESS POINT LOCATIONS WITHIN CABIN

TECHNICAL FIELD

The present disclosure relates to entertainment systems and, more particularly, in-flight entertainment systems.

BACKGROUND

In-flight entertainment (IFE) systems are deployed onboard aircraft to provide entertainment services for passengers in a passenger cabin. The IFE systems typically provide passengers with television and audio multimedia entertainment programming.

One type of IFE system is a "server centric" architecture where multimedia content is located on a server or a set of servers installed in an electronic bay in the airplane. Video content is played through displays installed at overhead locations or within seatbacks, and associated audio content is played through jacks provided in seat armrests.

Another type of IFE system is a "seat centric" architecture where content is stored in mass data storage devices located at individual seats and played through associated seat displays. The server (or set of servers) acts as an injection point for content that will be later installed locally into the seat mass data storage devices, and also acts as a secondary source for content that may not fit in the seat mass data storage devices.

There has also been an emergence of wireless systems providing connectivity within server centric architectures and seat centric architectures. These systems typically require less installation effort and use servers installed in airplane electronics equipment bays to provide content through Cabin Wireless Access Point (CWAPs) installed at spaced apart locations in overhead compartments of the airplane. Differences in architectures and aircraft seat layouts between aircraft necessitate separate and independent wireless IFE system setup configuration and testing by vendors and customers, which negatively offsets some of the advantages that can be provided relative to non-wireless systems.

SUMMARY

Some embodiments of the present invention are directed to a method by a cabin wireless access point (CWAP) server. The method includes receiving an IP address request message from a CWAP installed in a vehicle cabin. The IP address request message contains data identifying a physical location of the CWAP within the vehicle cabin. The physical location of the CWAP is identified responsive to the data contained in the IP address request message. An IP address is assigned to the CWAP responsive to the physical location of the CWAP, and an IP address message containing the IP address is communicated to the CWAP.

In some further embodiments, the IP address request message is received as a Dynamic Host Configuration Protocol (DHCP) discover request message containing the data which identifies one of a plurality of defined physical locations within the vehicle cabin. The IP address message is communicated to the CWAP as a DHCP offer message containing the IP address. CWAP configuration data can be communicated to the CWAP that indicates a frequency resource and/or transceiver transmission power level that have been assigned to the CWAP based on the physical location of the CWAP identified by the data.

A potential advantage of this approach is that the CWAP server can be automatically informed using DHCP messaging of the physical location of each CWAP within a vehicle cabin, and can separately configure each CWAP to avoid co-channel interference while improving air interface resource efficiency and communication bandwidth provided by the CWAPs.

Some other embodiments of the present invention are directed to a method by a CWAP. The method includes determining data that identifies a physical location of the CWAP within a vehicle cabin, and communicating to a CWAP server an IP address request message containing the data identifying the physical location of the CWAP within the vehicle cabin. An IP address message containing an IP address assigned to the CWAP is received from the CWAP server. The IP address assigned to the CWAP is then used to communicate with a content server.

In some further embodiments, the IP address request message is communicated as a DHCP discover request message containing the data which identifies one of a plurality of defined physical locations within the vehicle cabin, and the IP address message is received as a DHCP offer message containing the IP address.

Other CWAP servers, CWAPs, and methods according to embodiments of the present disclosure will be or become apparent to one with skill in the art upon review of the following drawings and detailed description. It is intended that all such additional CWAP servers, CWAPs, and methods be included within this description and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIG. 4 illustrates example fields of a DHCP message that can contain data identifying the physical location of a CWAP according to some embodiments;

FIG. 5 illustrates an example DHCP configuration file that is used by the CWAP server to assign IP addresses to CWAPs based on the reported data indicating the physical locations of the CWAPs. In accordance with some embodiments;

FIG. 6 illustrates example serving cells provided by the CWAPs under management of the CWAP server to avoid co-channel interference between cells and while improving resource efficiency and communication bandwidth provided by the CWAPs.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Although various embodiments are explained herein in the context of entertainment systems for an In-Flight Entertainment (IFE) environment of an aircraft, other embodiments are not limited thereto and may be used in other types of vehicles, including ships, buses, and trains, and other types of physical systems layouts, including conference rooms, classrooms, and buildings. For example, the operations and methods may be used by electronic line replaceable units (LRUs) to report their physical locations (e.g., rack number, slot number, etc.) to a server for management (e.g., configuration) of the LRUs based on their respective physical locations.

Figure 1:
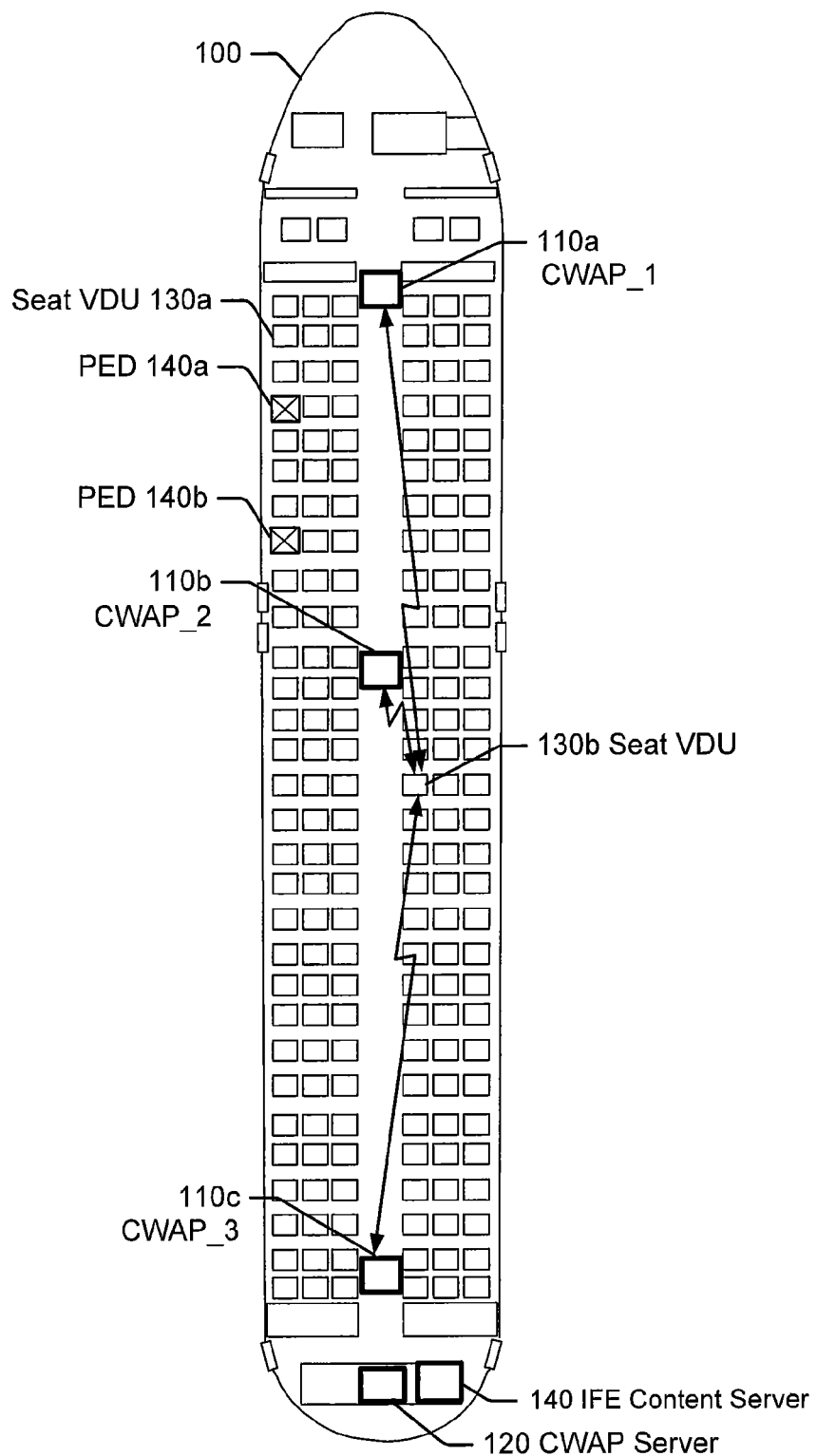
FIG. 1 illustrates an IFE system that includes a CWAP server that receives Dynamic Host Configuration Protocol (DHCP) discover request messages containing data identifying where CWAPs are installed at spaced apart locations within the vehicle cabin, in accordance with some embodiments.

FIG. 1 illustrates an IFE system that includes Cabin Wireless Access Points (CWAPs) CWAP_1 110a, CWAP_2 110b, and CWAP_3 110c that are installed (mounted) at spaced apart locations within an aircraft fuselage 100 to provide corresponding wireless communication service cells to seat video display units (VDUs) 130, personal electronic devices (PEDs) 140, and other types of wireless terminals. The CWAPs 110 communicate through a wireless air interface that can be based on one or more communication protocols including, without limitation, IEEE 802.11, WIMAX, 3GPP Long Term Evolution (LTE), etc. Because embodiments of the present disclosure can be used in other environments, a CWAP can also be more generally referred to as a wireless access point (WAP).

The seat VDUs 130 may include displays that are mounted to seatbacks and/or mounted to tray tables that are deployable from armrests. The PEDs 140 may correspond to any personal wireless terminal having wireless communications capabilities for communicating with the CWAPs and which can be carried by a passenger onto an aircraft, including, without limitation, tablet computers, laptop computers, palmtop computers, cellular smart phones, media players, etc. Embodiments of the present disclosure can be used with any plural number of CWAPs 110, seat VDUs 130, and PEDs 140, and are not limited to the example numbers shown in any of the figures.

The seat VDUs 130 and the PEDs 140 can be used by passengers for IFE services in which video and other content is wirelessly communicated from an IFE content server 140 to IP addresses of the seat VDUs 130 and/or PEDs 140 via the CWAPs 110 that provide wireless communication service to those seat VDUs 130 and/or PEDs 140. Passengers may also be provided in-flight shopping services through the seat VDUs 130 and the PEDs 140 based on product catalogs that are downloaded from the IFE content server 126. The seat VDUs 130 and the PEDs 140 may also be provided Internet connectivity through the CWAPs 110 and an off-board radio link to an Internet edge router.

In aircraft environments and many other enclosed environments it is very important to configure CWAPs 110 based on their installation locations. Configuration of the CWAPs 110 can include assigning operating frequencies, transmission power levels, etc, to avoid co-channel interference and while attempting to improve air interface resource efficiency and communication bandwidth provided by the CWAPs 110 (e.g., by maximizing allocated frequencies and frequency reuse in non-overlapping cells). In an aircraft, CWAPs 110 can be installed spaced apart along the roof of the cabin 100 (e.g., front of cabin, middle of cabin, rear of cabin). The number of CWAPs 110 and their installed location can vary based on the aircraft types, seat configurations, and individual customer preferences. For example, communication bandwidth and the maximum number of served terminals can be increased by increasing the number of installed CWAPs 110.

The network interconnection topology of the CWAPs 110 can also vary based on the aircraft types, seat configurations, and individual customer preferences. For example, in some installations the CWAPs 110 are connected in a daisy chain topology, in some other installations the CWAPs 110 are connected in a star topology, and yet is some other installations the CWAPs 110 are connected in a combination of daisy chain and star topologies.

In accordance with various embodiments disclosed herein, the CWAP server 120 configures each of the CWAPs 110 based on their respective locations within the aircraft. For each CWAP 110, the CWAP server 120 determines the physical location of the CWAP 110 within the aircraft, and assigns an IP address to the CWAP 110 based on its physical location. Moreover, the CWAP server 120 assigns frequency resources to the CWAPs 110 based on their respective physical locations, and/or may assign transceiver transmission power levels to the CWAPs 110 based on their respective physical locations.

In some embodiments, the CWAPs 110 report their physical locations to the CWAP server 120 using Dynamic Host Configuration Protocol (DHCP) discover request messages containing data identifying where the CWAPs 110 are installed. The CWAP server 120 can then assign IP addresses to the CWAPs 110 based on their physical location, and communicate the IP addresses to the CWAPs through DHCP offer messages. In this manner, IP addresses can be automatically assigned to CWAP network management interfaces based on the physical layout of the CWAPs 110 and without limitation of having to know the particular networked topology of the CWAPs for that particular installation.

Figure 2:
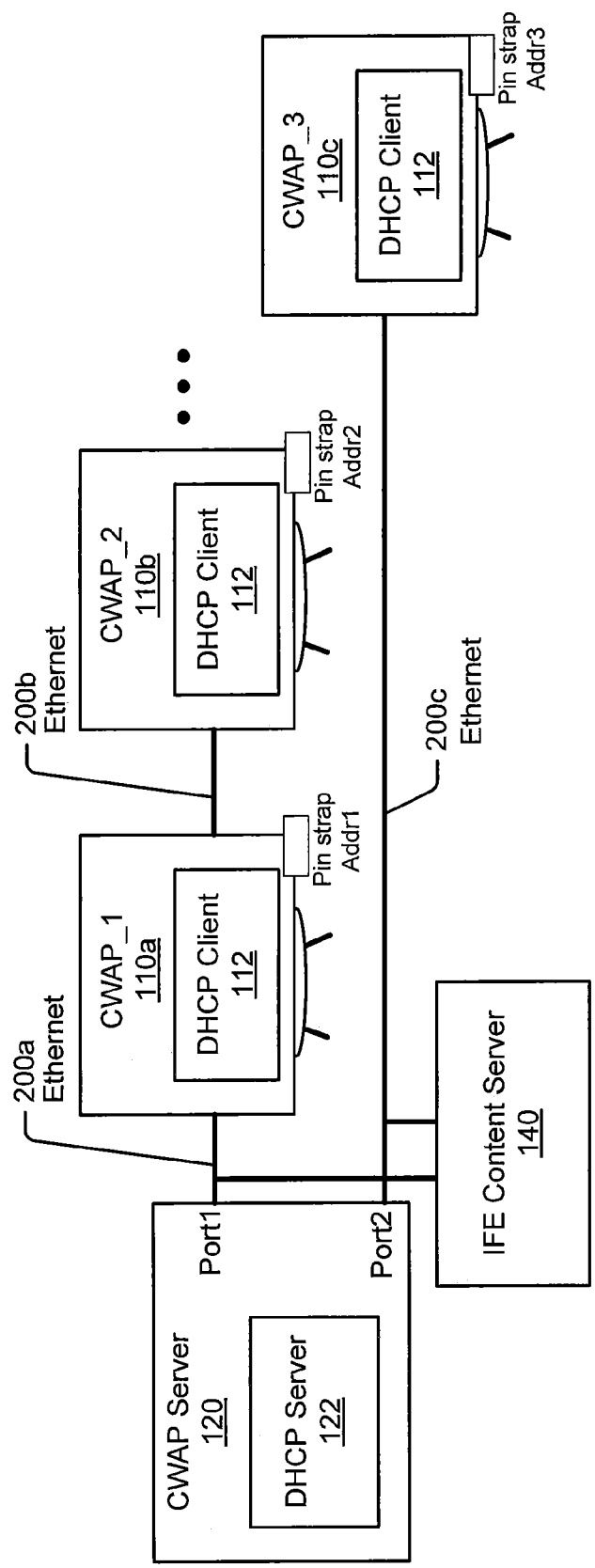
FIG. 2 is a block diagram of the CWAP server, the CWAPs, and the IFE content server of FIG. 1 configured according to some embodiments.

FIG. 2 is a block diagram of the CWAP server 120, the CWAPs 110, and the IFE content server 140 of FIG. 1 configured according to some embodiments. Referring to FIG. 2, the CWAP server 120 includes a DHCP server 122 and each of the CWAPs 110 include a DHCP client 112. A CWAP 110 uses the DHCP client 112 to acquire an IP address for its network management interface from the DHCP server 122. The DHCP server 122 maintains a configuration file that contains mapping between defined IP addresses and physical locations where the CWAPs 110 can be installed, and selects among the defined IP addresses for assignment to a CWAP 110 based on data that has been reported by the DHCP client 112 indicating a physical location where the CWAP 110 is installed.

Figure 3:
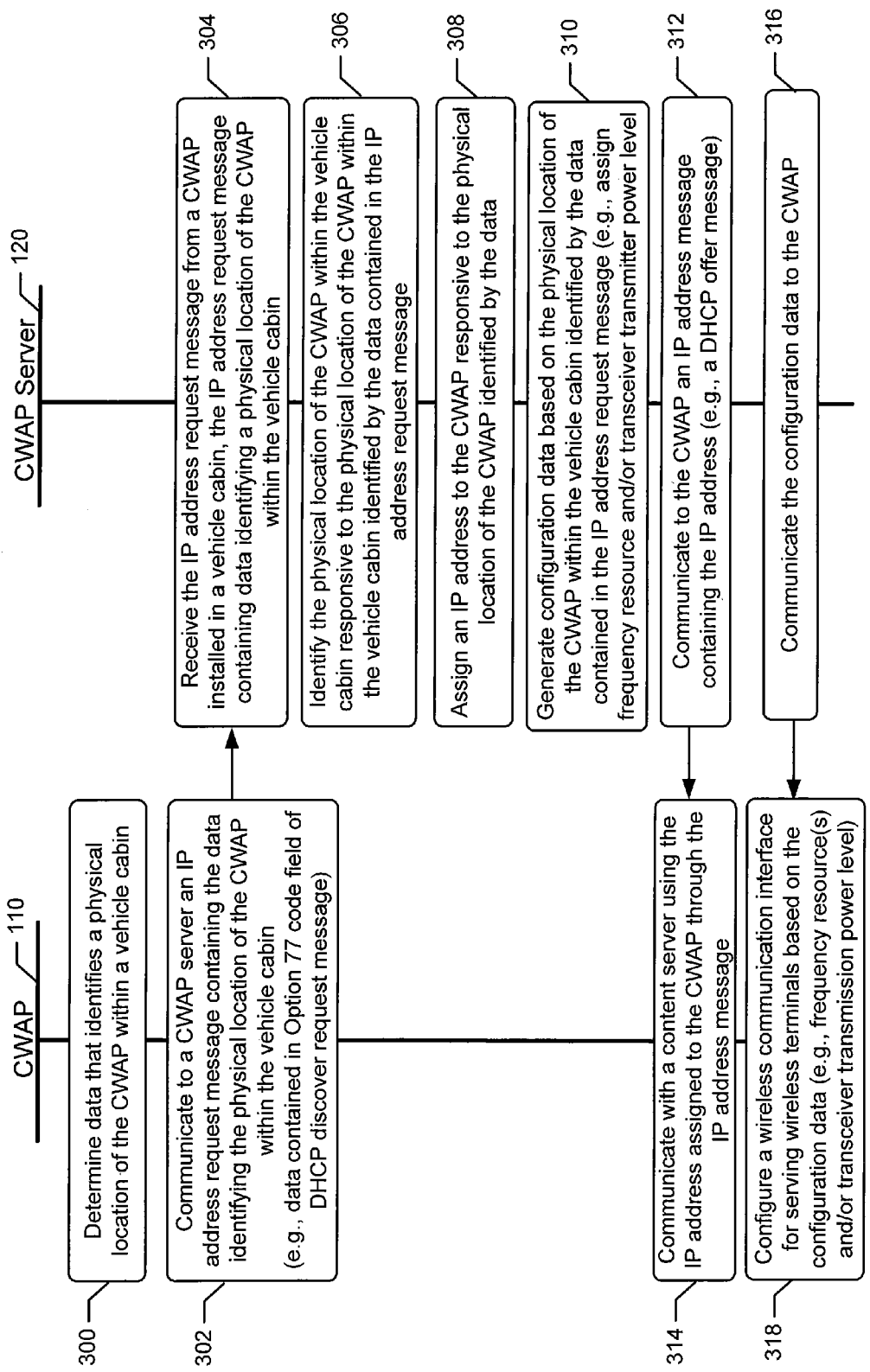
FIG. 3 is a combined flowchart and data flow diagram of operations and methods performed by the CWAPs and the CWAP server according to some embodiments.

FIG. 3 is a combined flowchart and data flow diagram of operations and methods performed by an example one of the CWAPs 110 and the CWAP server 120 according to some embodiments. Referring to FIG. 3, CWAP_1 110a and CWAP_2 110b are serially connected to Port 1 of the CWAP server 120 via Ethernet segments 200a and 200b. In contrast, CWAP_3 110c is connected to Port 2 of the CWAP server 120 via Ethernet segments 200*c*. The IFE content server 140 is also connected to the Ethernet segments.

The CWAP 110 determines (block 300) data that identifies a physical location of the CWAP 110 within the cabin 100, e.g., front of cabin, mid-cabin, rear of cabin, etc. The CWAP 110 may determine the data by, for example, reading a pin strap address generated by reading external connector pins of an interface of the CWAP 110 that have been pin strapped. An installer can set logical voltage levels of the pins by shorting some pins to a ground pin, shorting some pins to a voltage supply pin, and/or leaving some pins floating without shorting to the ground or voltage supply. The particular pins shorted to the ground, the voltage supply, and/or remaining floating can be selected to represent an address that is readable by the CWAP 110 and which has been defined by a configuration file in the CWAP server 120 as being associated with the physical location where the CWAP 110 is being installed.

In the example of FIG. 3, CWAP_1 110*a* is configured with pen strap Addr1 which the CWAP server 120 knows corresponds to the front of cabin, CWAP_2 110*b* is configured with pen strap Addr2 which the CWAP server 120 knows corresponds to mid-cabin, and CWAP_3 110*c* is configured with pen strap. Addr3 which the CWAP server 120 knows corresponds to the rear of cabin.

In some other embodiments, the data indicating the physical location may be determined by the CWAP 110 based on time-of-arrival triangulation of radio frequency signals received by the CWAP 110 from other CWAPs 110 and/or other wireless terminals within the cabin 100 and/or outside the cabin 100. For example, the CWAPs 100 can compare the time-of-arrival of a defined signal from one or more cellular radio transceiver base stations external to the cabin 100, and perform triangulation based on the comparisons to determine their relative positions within the cabin 100. In still some other embodiments, the data indicating the physical location may be determined by each of the CWAPs 110 based on time-of-arrival triangulation of audio signals (e.g., ultrasonic signals) received by the CWAP 110 from other CWAPs 110 having known transmission timings to determine its positions within the cabin 100 relative to the other CWAPs 110.

The CWAP 110 communicates (block 302) to the CWAP server 120 an IP address request message containing the data identifying the physical location of the CWAP within the vehicle cabin. The DHCP client 112 of the CWAP 110 can communicate the IP address request message as a Dynamic Host Configuration Protocol (DHCP) discover request message containing the data which identifies one of a plurality of defined physical locations within the vehicle cabin. The data identifying the physical location may be embedded as a value in an Option 77 code field of the DHCP discover request message formatted according to RFC 2131 and RFC 3004 by the Network Working Group, and with a messaging sequence based on RFC 2132.

The CWAP 110 may perform the determining (block 300) and communication (block 302) responsive to being powered-up as part of an initialization procedure.

FIG. 4 illustrates example fields of a DHCP message that can contain the data identifying the physical location of a CWAP according to some embodiments. Referring to FIG. 4, the option code "77" indicates a "user class" pursuant to RFC3004. The field N indicates length of user class data, and the value embedded as the user class data may be an ASCII text string that identifies the physical location of a CWAP and may correspond to, for example, the pin strapping address read by the DHCP client 112 on one of the CWAPs 110. For example, the DHCP client 112 of CWAP_1 110*a* may embed a value "CWAP_1" as the user class data in the Option 77 code field of the DHCP discover request message.

Referring again to FIG. 3, the CWAP server 120, e.g., via the DHCP server 122, receives (block 304) the IP address request message from the CWAP 110. As explained, the CWAP server 120 may receive the IP address request message as a DHCP discover request message containing the data which identifies one of a plurality of defined physical locations within the vehicle cabin. The CWAP server 120 identifies (block 306) the physical location of the CWAP 110 within the vehicle cabin responsive to the data contained in the IP address request message, and may identify the physical location of the CWAP within the vehicle cabin responsive to the user class data value contained in the Option 77 code field of the DHCP discover request message.

The CWAP server 120 can similarly receive IP address request messages (e.g., DHCP discover request messages) from each of the other CWAPs 110*b*, 110*c*, etc. and identify the physical location of each of the CWAPs based on the data contained in the IP address request messages.

The CWAP server 120, e.g., via the DHCP server 122, assigns (block 310) an IP address to the CWAP responsive to the physical location of the CWAP identified by the data. The DHCP server 122 can use the data indicating the physical location of the CWAP 110 to lookup the IP address that is to be assigned to the CWAP 100. The DHCP server 122 can maintain a DHCP configuration file that contains mapping between defined IP addresses and physical locations where the CWAPs 110 can be installed, and select among the defined IP addresses for assignment to a CWAP 110 based on the data that has been reported by the DHCP client 112 indicating a physical location where the CWAP 110 is installed.

FIG. 5 illustrates an example DHCP configuration file that is used by the DHCP server 122 to assign IP addresses to CWAPs based on the reported data indicating the physical locations of the CWAPs. Referring to the non-limiting example of FIG. 5, when the DHCP discover request message contains user class data "CWAP_1", the DHCP server 122 determines from the illustrated dhcpd.conf file that the corresponding CWAP is to be assigned IP address "172.17.8.2". Similarly, the DHCP server 122 determines from dhcpd.conf that CWAP is to be assigned IP address "172.17.8.4" when the DHCP discover request message contains user class data "CWAP_2", and is to be assigned IP address "172.17.8.48" when the DHCP discover request message contains user class data "CWAP_3". The DHCP server 122 may pick among available IP addresses within a defined range of IP addresses defined in dhcpd.conf corresponding to the user class data defining the physical location of a CWAP. In the non-limiting example of FIG. 5 each of the defined ranges contains a single IP address to be selected by the DHCP server responsive to the corresponding user class data.

Referring again to FIG. 3, the CWAP server 120 can generate (block 310) configuration database on the physical location of the CWAP 110 within the vehicle cabin identified by the data contained in the IP address request message (e.g., DHCP discover request message). The CWAP server 120 can assign a frequency resource to the CWAP based on the physical location of the CWAP. Alternatively or additionally, the CWAP server 120 can assign a transceiver transmission power level to the CWAP based on the physical location of the CWAP.

The CWAP server 120 can assign non-overlapping frequency resources to pairs of the CWAPs that are identified, based on the data contained in the DHCP discover request messages, as being physically located within a threshold range of each other. Furthermore, the CWAP server 120 can assign at least partially overlapping frequency resources to pairs of the CWAPs that are identified, based on the data contained in the DHCP discover request messages, as being physically located beyond the threshold range of each other. Assigning frequency resources to the CWAPs based on their physical locations can avoid co-channel interference and while attempting to improve air interface resource efficiency and communication bandwidth provided by the CWAPs 110 by maximizing allocated frequencies and frequency reuse in non-overlapping cells.

FIG. 6 illustrates example serving cells 500, 502, and 504 provided by respective ones of the CWAPs 110a, 110b, and 110c under management of the CWAP server 120 to avoid co-channel interference and while improving resource efficiency and communication bandwidth provided by the CWAPs 110a, 110b, and 110c. CWAPs 110a and 110b may be assigned substantially or entirely non-overlapping frequency resources for use in their respective partially overlapping cells 500 and 502 when communicating with served seat VDUs 130, PEDs 140, and other wireless terminals. In contrast, CWAPs 110a and 110c may be assigned substantially or entirely overlapping frequency resources for use in their respective non-overlapping cells 500 and 504 when communicating with served seat VDUs 130, PEDs 140, and other wireless terminals.

The CWAP server 120, e.g., via the DHCP server 122, communicates (block 312) to the CWAP 110 an IP address message containing the assigned IP address. The IP address message may be a DHCP offer message containing the assigned IP address. The CWAP server 120 may also communicate (block 316) configuration data identifying the assigned frequency resource and/or the assigned transceiver transmission power level.

The CWAP 110 receives from the CWAP server 120 the IP address message, e.g., DHCP offer message, containing an IP address assigned to the CWAP 110. The CWAP 110 can also receive from the CWAP server 120 the configuration data. The CWAP 110 can respond to a DHCP offer message by communicating a request message (e.g., DHCREQUEST message), informing the CWAP server 120 that the CWAP 110 will use the assigned IP address. The CWAP server 120 responds to the request message by communicating an ACK message (e.g., DHCPACK message) to the CWAP 100 confirming that the CWAP 100 has been given a lease on the IP address for a server-specific period of time.

A network management interface of the CWAP 110 then uses the assigned IP address when communicating (block 314) with the IFE content server 140. The CWAP 110 may, for example, request content (e.g., movies, television programming, games, applications, electronic books/magazines, etc.) and/or access the Internet through the content server 140 using messaging that includes the assigned IP address.

The CWAP 110 also configures (block 318) a wireless communication interface, such as a radio transceiver, based on the configuration data for serving wireless terminals. For example, the CWAP 110 can control, based on configuration data, a frequency resource(s) used by the radio transceiver when communicating with wireless terminals, such as the seat VDUs 130 and the PEDs 140. The CWAP 110 may additionally or alternatively control, based on the configuration data, transmission power level of the radio transceiver when communicating with wireless—terminals, such as the seat VDUs 130 and the PEDs 140.

In some further example embodiments the system may also associate content access permissions with the IP addresses assigned to the CWAPs 110 based on the data contained in the discover request messages identifying the physical location of the CWAPs 110 within the vehicle cabin. Accessibility of content, which is stored on the content server 140, to the seat VDUs 130 served by the CWAPs 110 can be controlled based on the content access permission associated with the respective IP addresses assigned to the CWAPs 110 serving the seat VDUs 130.

When controlling accessibility of content stored on the content server 140 to the seat VDUs 130, the operations can include receiving a content access request from a seat VDU 130 served by one of the CWAPs 110, where the content access request requests access to defined content stored on the content server 140. The operations further include identifying from the content access request the IP address assigned to the one of the CWAPs 110, and selecting between allowing and preventing delivery of the defined content based on the content access permission associated with the IP address identified from the content access request. The operations of these further example embodiments may be performed by the CWAPs 110 and/or in combination with the content server 140 and/or another network node in the system.

Figure 7:
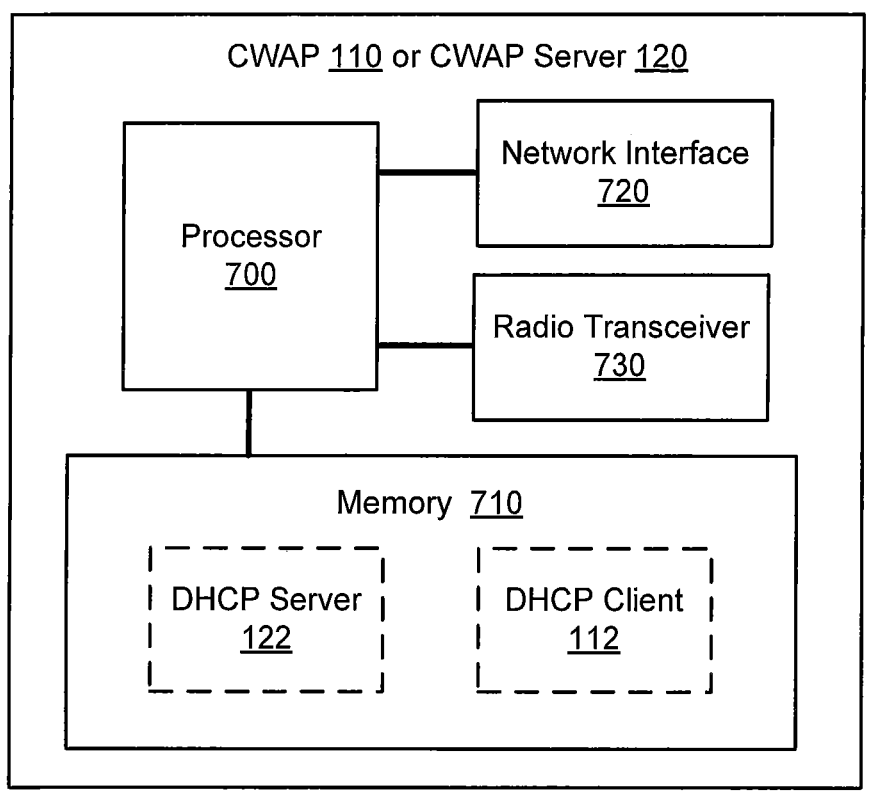
FIG. 7 is a block diagram of the CWAP and/or the CWAP server configured according to some embodiments.

FIG. 7 is a block diagram of an electronic components a network node that may be used in a CWAP 100 and/or a CWAP server 120 and configured according to some embodiments of the present disclosure. The network node includes at least one processor 700 ("processor"), at least one memory 710 ("memory"), and at last one network interface 720 ("network interface"). When configured as a CWAP 110, the node further includes a radio transceiver 730. The processor 700 may include one or more data processing circuits, such as a general purpose and/or special purpose processor (e.g., microprocessor and/or digital signal processor) that may be collocated or distributed across one or more networks. The processor 700 is configured to execute computer readable program code in the memory 710, described below as a non-transitory computer readable medium, to perform some or all of the operations and methods that are described herein for one or more of the embodiments.

The memory 710 can include a DHCP server program code 122 when the node if configured to operate as a CWAP server 120, or can include DHCP client program code 112 when the node is configured to operate as a CWAP 110. The program code is configured to perform the operations or more of more of the embodiments disclosed herein. The network interface 720 can communicatively connect a CWAP server and the CWAPs.

Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless' the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a non-transitory computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A method by a Cabin Wireless Access Point (CWAP) server, comprising:
receiving from each of a plurality of CWAPs spaced apart within the vehicle cabin, a Dynamic Host Configuration Protocol (DHCP) discover request message from the CWAP installed in a vehicle cabin, the DHCP discover request message containing data identifying one of a plurality of defined physical locations within the vehicle cabin where a respective one of the CWAPs is installed;
for each of the plurality of CWAPs, identifying the physical location of the CWAP within the vehicle cabin responsive to a value contained in an Option 77 code field of the DHCP discover request message;

for each of the plurality of CWAPs, assigning an IP address to the CWAP responsive to the physical location of the CWAP identified by the value contained in the Option 77 code;

for each of the plurality of CWAPs, communicating to the CWAP a DHCP offer message containing the IP address;

for each of the plurality of CWAPs, assigning a frequency resource to the CWAP responsive to the physical location of the CWAP identified by the value contained in the Option 77 code, by operations comprising:

assigning non-overlapping frequency resources to pairs of the CWAPs that are identified, based on the value contained in the Option 77 code, as being physically located within a threshold range of each other; and assigning at least partially overlapping frequency resources to pairs of the CWAPs that are identified, based on the value contained in the Option 77 code, as being physically located beyond the threshold range of each other; and for each of the plurality of CWAPs, communicating to the CWAP configuration data identifying the frequency resource assigned to the CWAP.

2. The method of claim 1, further comprising:

for each of the plurality of CWAPs, assigning a transceiver transmission power level to the CWAP based on the defined physical location within the vehicle cabin identified by the data contained in the DHCP discover request message from the CWAP; and for each of the plurality of CWAPs, communicating to the CWAP configuration data identifying the transceiver transmission power level assigned to the CWAP.

3. The method of claim 1, further comprising:

associating content access permissions with the IP addresses assigned to the CWAPs based on the data contained in the discover request messages identifying the physical location of the CWAPs within the vehicle cabin;

controlling accessibility of content, which is stored on a content server, to video display units served by the CWAPs based on the content access permission associated with the respective IP addresses assigned to the CWAPs serving the video display units.

4. The method of claim 3, wherein controlling accessibility of content, which is stored on the content server, to video display units served by the CWAPs, comprises:

receiving a content access request from a video display unit served by one of the CWAPs, the content access request requesting access to defined content stored on the content server;

identifying from the content access request the IP address assigned to the one of the CWAPs;

selecting between allowing and preventing delivery of the defined content based on the content access permission associated with the IP address identified from the content access request.

5. The method of claim 1, further comprising:

for each of the plurality of CWAPs, assigning a transceiver transmission power level to the CWAP based on the physical location of the CWAP identified by the value contained in the Option 77 code, and communicating to the CWAP data identifying the transceiver transmission power level assigned to the CWAP.

6. The method of claim 1, further comprising:

associating content access permissions with the IP addresses assigned to the CWAPs based on the physical location of the CWAPs within the vehicle cabin;

controlling accessibility of content, which is stored on a content server, to video display units served by the CWAPs based on the content access permission associated with the respective IP addresses assigned to the CWAPs serving the video display units.

7. The method of claim 6, wherein controlling accessibility of content, which is stored on the content server, to video display units served by the CWAPs, comprises:

receiving a content access request from a video display unit served by one of the CWAPs, the content access request requesting access to defined content stored on the content server;

identifying from the content access request the IP address assigned to the one of the CWAPs;

selecting between allowing and preventing delivery of the defined content based on the content access permission associated with the IP address identified from the content access request.

8. A Cabin Wireless Access Point (CWAP) server, comprising:

at least one communication interface configured to communicate via a network with CWAPs spaced apart within the cabin;

at least one processor connected to the at least one communication interface; and at least one memory storing program code that is executed by the at least one processor to perform operations comprising:

receiving from each of a plurality of CWAPs spaced apart within the vehicle cabin, a Dynamic Host Configuration Protocol (DHCP) discover request message from the CWAP installed in a vehicle cabin, the DHCP discover request message containing data identifying one of a plurality of defined physical locations within the vehicle cabin where a respective one of the CWAPs is installed;

for each of the plurality of CWAPs, identifying the physical location of the CWAP within the vehicle cabin responsive to a value contained in an Option 77 code field of the DHCP discover request message;

for each of the plurality of CWAPs, assigning an IP address to the CWAP responsive to the physical location of the CWAP identified by the value contained in the Option 77 code;

for each of the plurality of CWAPs, communicating to the CWAP a DHCP offer message containing the IP address;

for each of the plurality of CWAPs, assigning a frequency resource to the CWAP responsive to the physical location of the CWAP identified by the value contained in the Option 77 code, by operations comprising:

assigning non-overlapping frequency resources to pairs of the CWAPs that are identified, based on the value contained in the Option 77 code, as being physically located within a threshold range of each other; and assigning at least partially overlapping frequency resources to pairs of the CWAPs that are identified, based on the value contained in the Option 77 code, as being physically located beyond the threshold range of each other; and for each of the plurality of CWAPs, communicating to the CWAP configuration data identifying the frequency resource assigned to the CWAP.

9. The CWAP server of claim 8, wherein the operations further comprise:
assigning a frequency resource to the CWAP based on the physical location of the CWAP identified by the data contained in the IP address request message; and
communicating to the CWAP through the at least one communication interface, configuration data identifying the assigned frequency resource.

10. The CWAP server of claim 8, wherein the operations further comprise:
assigning a transceiver transmission power level to the CWAP based on the physical location of the CWAP identified by the data contained in the IP address request message; and
communicating to the CWAP through the at least one communication interface, configuration data identifying the transceiver transmission power level.

11. The CWAP server of claim 8, wherein:
the receiving the IP address request message from the CWAP installed in the vehicle cabin, comprises receiving the IP address request message as a Dynamic Host Configuration Protocol (DHCP) discover request message containing the data which identifies one of a plurality of defined physical locations within the vehicle cabin; and
the communicating to the CWAP the IP address message containing the IP address, comprises communicating to the CWAP a DHCP offer message containing the IP address.

12. The CWAP server of claim 11, wherein the identifying the physical location of the CWAP within the vehicle cabin responsive to the data contained in the IP address request message, comprises:
identifying the physical location of the CWAP within the vehicle cabin responsive to a value contained in an Option 77 code field of the DHCP discover request message.

13. The CWAP server of claim 12, wherein the operations further comprise:
receiving a DHCP discover request message from each of a plurality of CWAPs spaced apart within the vehicle cabin, each of the DHCP discover request messages contains data identifying one of a plurality of defined physical locations within the vehicle cabin where a respective one of the CWAPs is installed;
for each of the plurality of CWAPs, selecting responsive to the data an IP address that has been defined for use by a CWAP installed at the identified one of the defined physical locations; and
for each of the plurality of CWAPs, communicating to the CWAP a DHCP offer message containing the IP address assigned to the CWAP.

\* \* \* \* \*